US012114067B2

United States Patent
Yao et al.

(10) Patent No.: US 12,114,067 B2
(45) Date of Patent: Oct. 8, 2024

(54) DATA PROCESSING SYSTEM, DATA PROCESSING METHOD, AND COMPUTER READABLE STORAGE MEDIUM

(71) Applicant: HTC Corporation, Taoyuan (TW)

(72) Inventors: Tun-Han Yao, Taoyuan (TW); Bo-Xun Wang, Taoyuan (TW)

(73) Assignee: HTC Corporation, Taoyuan (TW)

( * ) Notice: Subject to any disclaimer, the term of this patent is extended or adjusted under 35 U.S.C. 154(b) by 179 days.

(21) Appl. No.: 17/887,508

(22) Filed: Aug. 14, 2022

(65) Prior Publication Data

US 2023/0217101 A1 Jul. 6, 2023

Related U.S. Application Data

(60) Provisional application No. 63/297,222, filed on Jan. 6, 2022.

(51) Int. Cl.
*H04N 23/661* (2023.01)
*H04N 23/695* (2023.01)

(52) U.S. Cl.
CPC ......... *H04N 23/661* (2023.01); *H04N 23/695* (2023.01)

(58) Field of Classification Search
CPC ........... H04N 1/00079; H04N 1/00082; H04N 1/00124; H04N 1/00217; H04N 21/64707; H04N 21/65; H04N 21/6547; H04N 21/658; H04N 21/6581; H04N 23/66; H04N 23/661; H04N 23/662; H04N 23/665; H04N 23/695; H04N 23/69
See application file for complete search history.

(56) References Cited

U.S. PATENT DOCUMENTS

2022/0272235 A1* 8/2022 Gordon ................. G01S 1/7036
2023/0239422 A1* 7/2023 Tang ..................... H04N 5/2226
348/222.1

FOREIGN PATENT DOCUMENTS

TW 201205122 2/2012
TW 201923745 6/2019

OTHER PUBLICATIONS

"Office Action of Taiwan Counterpart Application", issued on Jan. 31, 2023, p. 1-p. 4.

* cited by examiner

*Primary Examiner* — Daniel M Pasiewicz
(74) *Attorney, Agent, or Firm* — JCIPRNET (57) ABSTRACT

The embodiments of the disclosure provide a data processing system, a data processing method, and a computer readable storage medium. The method includes: receiving a positioning data from a positioning device, wherein the positioning data corresponds to a camera device; receiving a lens parameter of the camera device from a lens encoder; encapsulating the positioning data and the lens parameter in at least one data packet; and sending the at least one data packet to a data processing device by a network interface.

19 Claims, 6 Drawing Sheets

DATA PROCESSING SYSTEM, DATA PROCESSING METHOD, AND COMPUTER READABLE STORAGE MEDIUM

CROSS-REFERENCE TO RELATED APPLICATION

This application claims the priority benefit of U.S. provisional application Ser. No. 63/297,222, filed on Jan. 6, 2022. The entirety of the above-mentioned patent application is hereby incorporated by reference herein and made a part of this specification.

BACKGROUND

1. Field of the Invention

The present disclosure relates to a data processing method, and a computer readable storage medium.

2. Description of Related Art

When content creators are shooting contents for virtual production (e.g., the production of virtual reality contents) with cameras, it is crucial to accurately track the camera and/or other to-be-tracked objects. Conventionally, the content creators and/or the related staff need to spend hours on complicated installations of the tracking devices for the cameras, which slows down the progress and increases the difficulty of creating the virtual productions.

SUMMARY OF THE INVENTION

Accordingly, the disclosure is directed to a data processing system, a data processing method, and a computer readable storage medium, which may be used to solve the above technical problems.

The embodiments of the disclosure provide a data processing system, including a signal processing device. The signal processing device performs: receiving a positioning data from a positioning device, wherein the positioning data corresponds to a camera device; receiving a lens parameter of the camera device from a lens encoder; encapsulating the positioning data and the lens parameter in at least one data packet; and sending the at least one data packet to a data processing device by a network interface.

The embodiments of the disclosure provide a data processing method, including: receiving, by a signal processing device, a positioning data from a positioning device, wherein the positioning data corresponds to a camera device; receiving, by the signal processing device, a lens parameter of the camera device from a lens encoder; encapsulating, by the signal processing device, the positioning data and the lens parameter in at least one data packet; and sending, by the signal processing device, the at least one data packet to a data processing device by a network interface.

The embodiments of the disclosure provide a computer readable storage medium, the computer readable storage medium recording an executable computer program, the executable computer program being loaded by a data processing system to perform steps of: receiving a positioning data from a positioning device, wherein the positioning data corresponds to a camera device; receiving a lens parameter of the camera device from a lens encoder; encapsulating the positioning data and the lens parameter in at least one data packet; and sending the at least one data packet to a data processing device by a network interface.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the disclosure.

DESCRIPTION OF THE EMBODIMENTS

Reference will now be made in detail to the present preferred embodiments of the invention, examples of which are illustrated in the accompanying drawings. Wherever possible, the same reference numbers are used in the drawings and the description to refer to the same or like parts.

Figure 1:
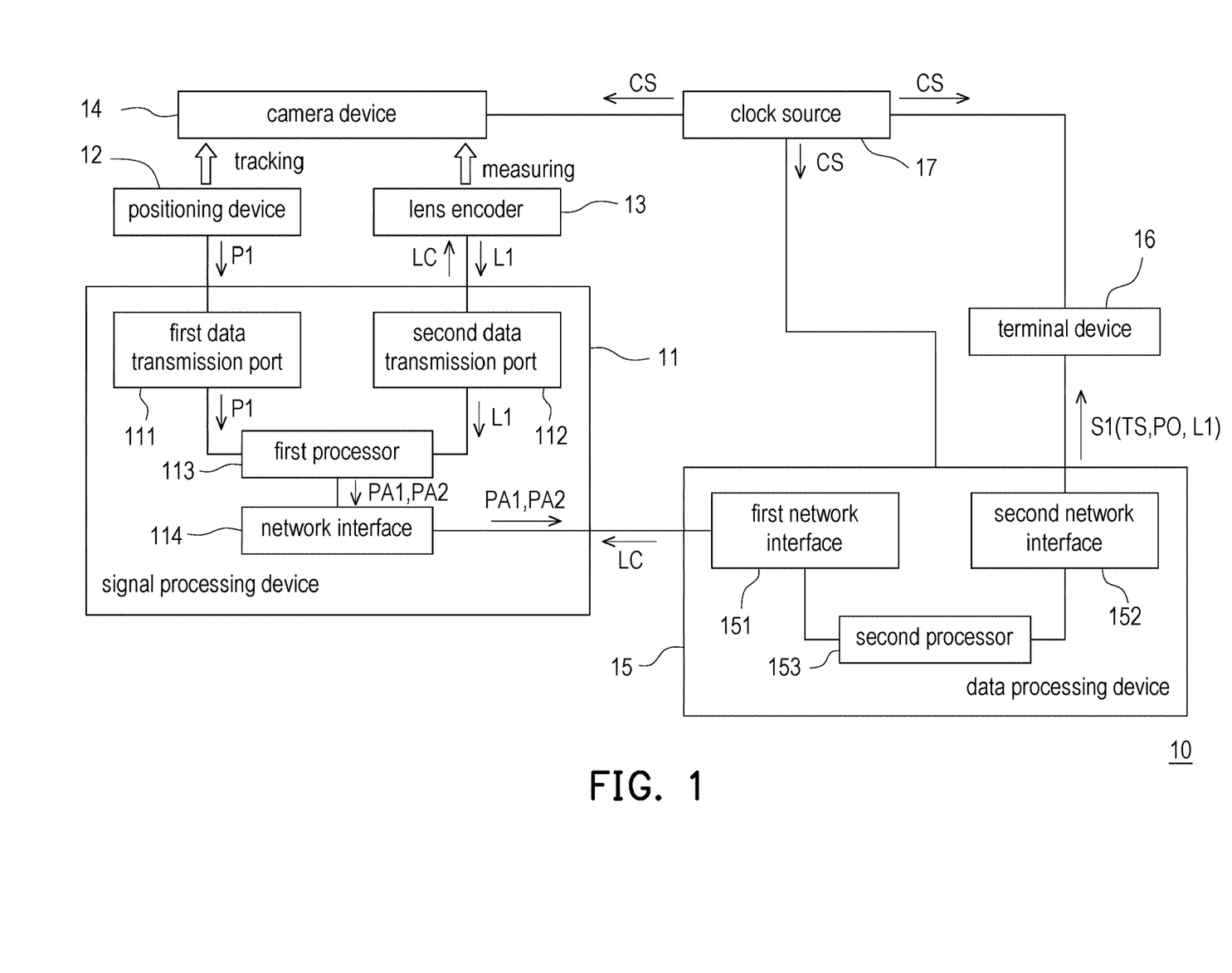
FIG. 1 shows a schematic diagram of a data processing system according to an embodiment of the disclosure.

See FIG. 1, which shows a schematic diagram of a data processing system according to an embodiment of the disclosure. In FIG. 1, the data processing system 10 may include a signal processing device 11, a positioning device 12, a lens encoder 13, a camera device 14, a data processing device 15, a terminal device 16, and a clock source 17.

In the embodiments of the disclosure, the camera device 14 can be used for shooting contents of virtual production. For example, the camera device 14 can be disposed in a studio, wherein the studio can be disposed with, for example, a green screen and/or other equipment for shooting (e.g., light sources). In one embodiment, actors/actresses can stand in front of the green screen, and the camera device 14 can be used to shoot images of the actors/actresses in front of the green screen. Afterwards, the image regions corresponding to the actors/actresses can be extracted and combined with virtual backgrounds as the visual contents of virtual production, but the disclosure is not limited thereto.

In one embodiment, the positioning device 12 can be (fixedly) mounted on the camera device 14 via, for examples, screws or other adapting structures. In one embodiment, the positioning device 12 can be used to detect the positioning data P1 of the positioning device 12. Since the positioning device 12 is (fixedly) mounted on the camera device 14, the positioning device 12 can be moved in response to the movement of the camera device 14. In this case, the positioning data P1 of the positioning device 12 can be regarded as the positioning data P1 of the camera device 14.

In some embodiments, the positioning data P1 of the camera device 14 may include raw measurement data of the translation components and/or rotation components (e.g., the 6 degree of freedom) of the camera device 14, but the disclosure is not limited thereto. In one embodiment, the positioning device 12 can be a tracker attached to the camera device 14 and may detect the positioning data P1 of the positioning device 12 and/or the camera device 14 via, for example, outside-in tracking mechanism or inside-out mechanism. In outside-in tracking case, the environment can be disposed with several base stations emitting beacons for the tracker to accordingly detect the positioning data P1 of the positioning device 12 and/or the camera device 14. In other embodiments, the positioning device 12 can use any existing positioning mechanism to determine the positioning data P1 of the positioning device 12 and/or the camera device 14.

In one embodiment, the lens encoder 13 can be disposed on the camera device 14 and connected to (the lens of) the camera device 14 for measuring/reading/detecting the lens parameter L1 of the lens of the camera device 14.

In one embodiment, the lens parameter L1 obtained by the lens encoder 13 can include at least one counting value corresponding to at least one of an iris, a focus, a focal length of the lens of the camera device 14. In one embodiment, the counting value can be mapped by, for example, the terminal device 16 to the actual setting values of the iris, the focus, and/or the focal length of the lens of the camera device 14, but the disclosure is not limited thereto.

In FIG. 1, the signal processing device 11 may include a first data transmission port 111, a second data transmission port 112, a first processor 113, and a network interface 114. The first data transmission port 111 is coupled to the positioning device 12 and receiving the positioning data P1 from the positioning device 12. The second data transmission port 112 is coupled to the lens encoder 13 and receives the lens parameter L1 of the camera device 14 from the lens encoder 13.

In other embodiments, the signal processing device 11 can include more data transmission ports for connecting with other positioning devices and/or lens encoders. For example, in one embodiment, the signal processing device 11 can include two more data transmission ports for connecting two additional lens encoders and receiving the corresponding lens parameter measured by the two additional lens encoders, but the disclosure is not limited thereto.

In some embodiments, the first data transmission port 111, the second data transmission port 112 (and other data transmission ports) can be plug and play ports/interfaces, such as universal serial bus (USB) ports/interfaces, but the disclosure is not limited thereto.

The first processor 113 is coupled to the first data transmission port 111 and the second data transmission port 112. In various embodiments, the first processor 113 may be, for example, a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Array (FPGAs) circuits, any other type of integrated circuit (IC), a state machine, and the like.

In one embodiment, the first processor 113 encapsulates the positioning data P1 and the lens parameter L1 in at least one data packet. In one embodiment, the at least one data packet may include a first data packet PA1 containing the lens parameter L1 and a second data packet PA2 containing the positioning data P1, but the disclosure is not limited thereto.

In FIG. 1, the network interface 114 is coupled to the first processor 113 and send the at least one data packet to the data processing device 15 for further processing. In the embodiments of the disclosure, the network interface 114 (and other network interfaces considered in the disclosure) can be, for example, Ethernet interfaces, but the disclosure is not limited thereto.

In one embodiment, the first data packet PA1 can be a User Datagram Protocol (UDP) packet, and the first processor 113 can control the network interface 114 to send the first data packet PA1 via a UDP protocol. In addition, the second data packet PA2 can be a Transmission Control Protocol/Internet Protocol (TCP/IP) packet, and the first processor 113 can control the network interface 114 to send the second data packet PA2 via a Universal Serial Bus/IP (USB/IP) protocol, but the disclosure is not limited thereto.

In other embodiments, the first data packet PA1 and the second data packet PA2 can be implemented as the packets corresponding to the desired protocol of the designer.

In FIG. 1, the data processing device 15 includes a first network interface 151, a second network interface 152, and a second processor 153.

In one embodiment, the second processor 153 is coupled to the first network interface 151 and the second network interface 152, and the possible implementations of the second processor 153 may be referred to the descriptions of the first processor 113, but the disclosure is not limited thereto.

In one embodiment, the first network interface 151 is coupled to the network interface 114 of the signal processing device 11 and receives the at least one data packet (e.g., the first data packet PA1 and the second data packet PA2) from the signal processing device 11. In one embodiment, the second processor 153 may retrieve the positioning data P1 and the lens parameter L1 from the at least one data packet. For example, the second processor 153 may retrieve the lens parameter L1 from the first data packet PA1 and retrieve the positioning data P1 from the second data packet PA2, but the disclosure is not limited thereto.

In one embodiment, the second processor 153 determines a camera pose PO of the camera device 14 based on the positioning data P1. In the embodiment where the positioning data P1 includes the raw measurement data of the translation components and/or rotation components of the camera device 14, the second processor 153 may analyse/process the positioning data P1 and accordingly determine the actual translation components and/or rotation components of the camera device 14 as the camera pose PO. From another perspective, the signal processing device 11 forwards the raw measurement data (e.g., the positioning data P1 detected by the positioning device 12) of the camera pose PO to the data processing device 15, and the data processing device 15 accordingly determine the camera pose PO by analysing the raw measurement data, but the disclosure is not limited thereto.

In one embodiment, the second processor 153 receives a reference clock signal CS from the clock source 17 coupled to the camera device 14, the data processing device 15, and the terminal device 16. In one embodiment, the reference clock signal CS can be a reference signal for the camera device 14, the data processing device 15, and the terminal device 16 to perform synchronization. In one embodiment, the reference clock signal CS may be a pulse train including a plurality of clock pulses, wherein the clock pulses may be provided under a specific frequency. In this case, the duration between adjacent clock pulses can be a reciprocal of the specific frequency.

In one embodiment, the second processor 153 may determine a timestamp TS corresponding to the camera pose PO. For example, the second processor 153 can determine camera pose PO and the timestamp TS in response to one of the clock pulses, wherein the timestamp TS corresponds to a timing point of the one of the clock pulses. In one embodiment, the second processor 153 can use the timing point of the one of the clock pulses as the timestamp TS corresponding to the camera pose PO. That is, the second processor 153 follows the timing of the reference clock signal CS to determine the camera pose PO and the corresponding timestamp TS.

In one embodiment, the second processor 153 encapsulate the camera pose PO, the timestamp TS, and the lens parameter L1 in a data signal S1 and sends the data signal S1 via the second network interface 152.

In FIG. 1, the terminal device 16 coupled to the data processing device 15 can be any smart devices and/or computer devices used for rendering visual contents of the virtual production. In one embodiment, the terminal device 16 can be the computer used by the content creator for editing the visual content of the virtual production, but the disclosure is not limited thereto.

In one embodiment, the terminal device 16 may receive the data signal S1 from the data processing device 15. Accordingly, the terminal device 16 could know the lens parameter L1 and the status of the camera pose PO at the timestamp TS from the data signal S1. In addition, each image captured by camera device 14 can be labelled, by the camera device 14, with corresponding timestamp based on the reference clock signal CS, and the captured images with the corresponding timestamp would be provided to the terminal device 16. In this case, the terminal device 16 can know the camera poses of the camera device 14 when shooting the images based on the timestamp of each image and each camera pose.

For example, when the terminal device 16 determines that a specific image among the images captured by the camera device 14 has a timestamp same as the timestamp TS, the terminal device 16 can determine the camera pose PO is the camera pose of the camera device 14 when shooting the specific image.

In one embodiment, the terminal device 16 can run/render a virtual scene (e.g., a VR scene). In this case, when the camera device 14 is used to shoot some real objects (e.g., actor/actress) as the specific image, the terminal device 16 can crop/segment the image regions corresponding to the real objects from the specific image and combine the cropped image regions with the virtual scene to produce a virtual production video. In the embodiment, the virtual scene includes a virtual camera corresponding to the camera device 14, and the pose of the virtual camera in the virtual scene needs to be referred to the camera pose PO (e.g., rotation and/or translation) of the camera device 14 when shooting the specific image. Since the solution provided by the embodiments of the disclosure can obtain accurate camera pose PO of the camera device 14, the cropped image region can be accurately combined with the virtual scene, which improves the quality of the virtual production.

In one embodiment, the signal processing device 11 can further receive a lens controlling signal LC and accordingly control the lens encoder 13 to adjust a lens setting of the camera device 14. In one embodiment, the lens setting of the camera device 14 may include, for example, the iris, focus, and/or focal length of the lens of the camera device 14, and the user can determine the lens setting via, for example, operating a control interface (e.g. software/hardware) of the terminal device 16. In this case, the terminal device 16 can control the data processing device 15 to send the lens controlling signal LC to the signal processing device 11 according to the setting of the user. Accordingly, the signal processing device 11 can control the lens encoder 13 to adjust the lens setting of the camera device 14 to be corresponding to the requirement of the user, but the disclosure is not limited thereto.

Figure 2:
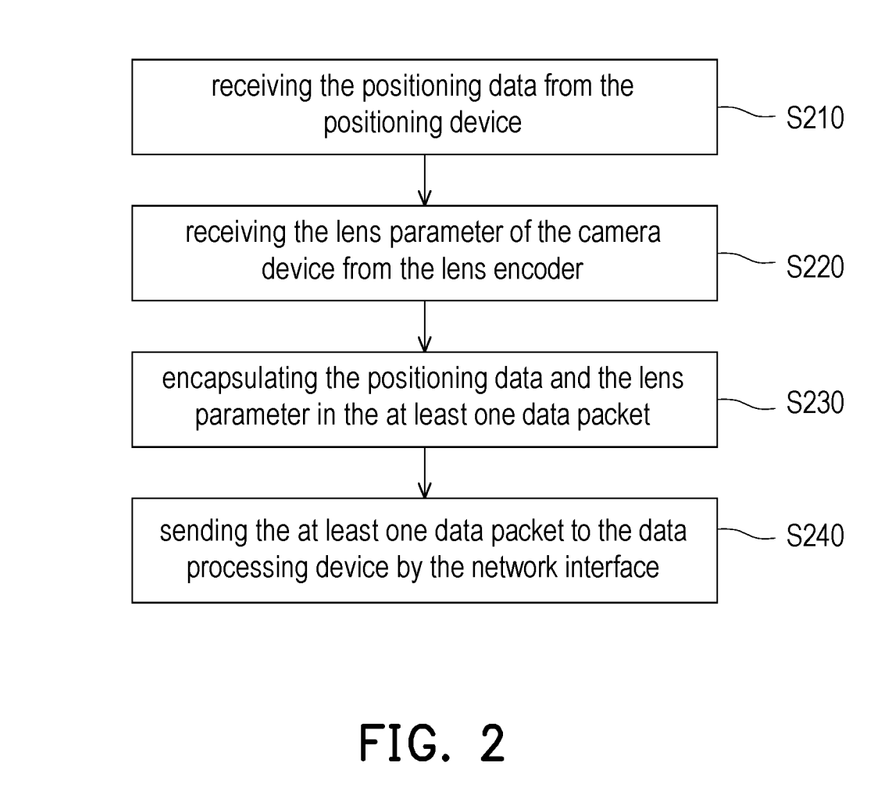
FIG. 2 shows a flow chart of the data processing method according to an embodiment of the disclosure.

See FIG. 2, which shows a flow chart of the data processing method according to an embodiment of the disclosure. The method of this embodiment may be executed by the signal processing device 11 in FIG. 1, and the details of each step in FIG. 2 will be described below with the components shown in FIG. 1.

In step S210, the signal processing device 11 receives the positioning data P1 from the positioning device 12. In step S220, the signal processing device 11 receives the lens parameter L1 of the camera device 14 from the lens encoder 13. In step S230, the signal processing device 11 encapsulates the positioning data P1 and the lens parameter L1 in the at least one data packet (e.g., the first data packet PA1 and the second data packet PA2). In step S240, the signal processing device 11 sends the at least one data packet. Details of the steps in FIG. 2 can be referred to the descriptions in the above, which would not be repeated herein.

Figure 3:
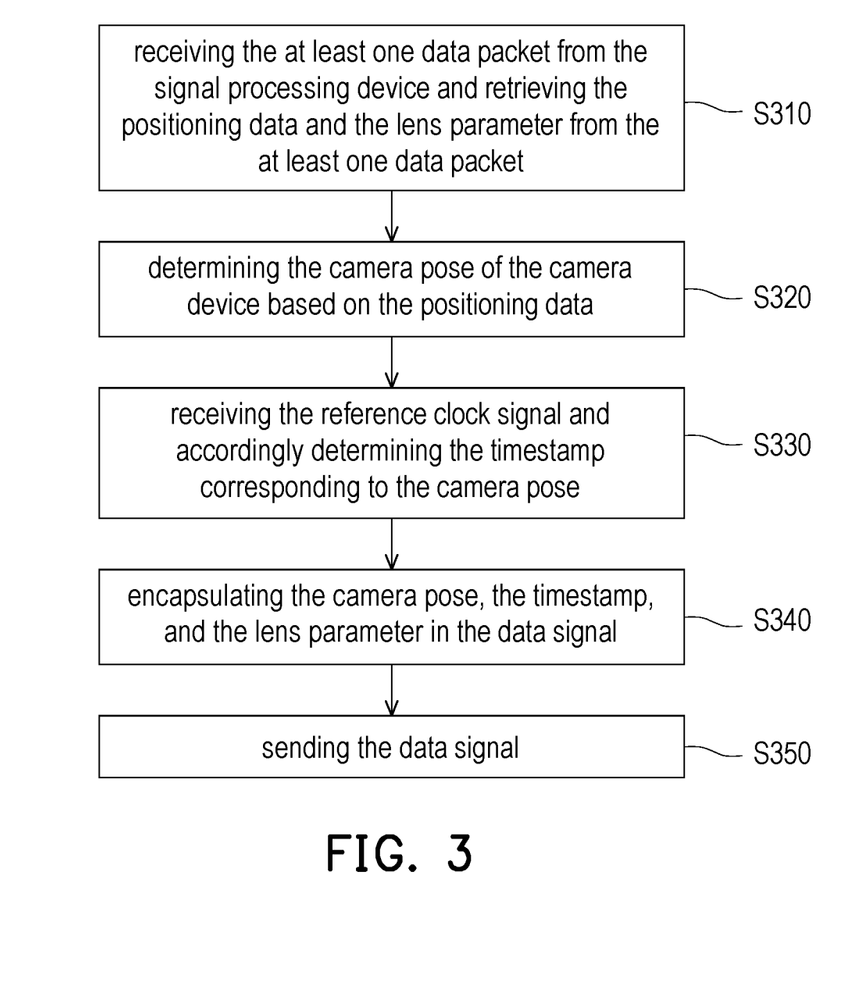
FIG. 3 shows a flow chart of the data processing method according to an embodiment of the disclosure.

See FIG. 3, which shows a flow chart of the data processing method according to an embodiment of the disclosure. The method of this embodiment may be executed by the data processing device 15 in FIG. 1, and the details of each step in FIG. 3 will be described below with the components shown in FIG. 1.

In step S310, the data processing device 15 receives the at least one data packet from the signal processing device 11 and retrieves the positioning data P1 and the lens parameter L1 from the at least one data packet. In step S320, the data processing device 15 determines the camera pose PO of the camera device 14 based on the positioning data P1. In step S330, the data processing device 15 receives the reference clock signal CS and accordingly determine the timestamp TS corresponding to the camera pose PO. In step S340, the data processing device 15 encapsulates the camera pose PO, the timestamp TS, and the lens parameter L1 in the data signal S1. In step S350, the data processing device 15 sends the data signal S1. Details of the steps in FIG. 3 can be referred to the descriptions in the above, which would not be repeated herein.

As can be understood in the above, the embodiments of the disclosure provide an easy, effective solution to accurately track the camera pose of the camera device when shooting contents. In the embodiments of the disclosure, the user (e.g., content creators) only needs to install the positioning device 12 and the lens encoder 13 onto the camera device 14, and the signal processing device 11 and the data processing device 15 can cooperate to facilitate the terminal device 16 to synchronize the captured images and the camera poses of the camera device 14. Accordingly, the efficiency of creating virtual production can be improved.

In addition, the embodiments of the disclosure further provide a method for determining coordinates, which can be carried out by the data processing system of the disclosure, and the details thereof would be introduced in the following.

Figure 4:
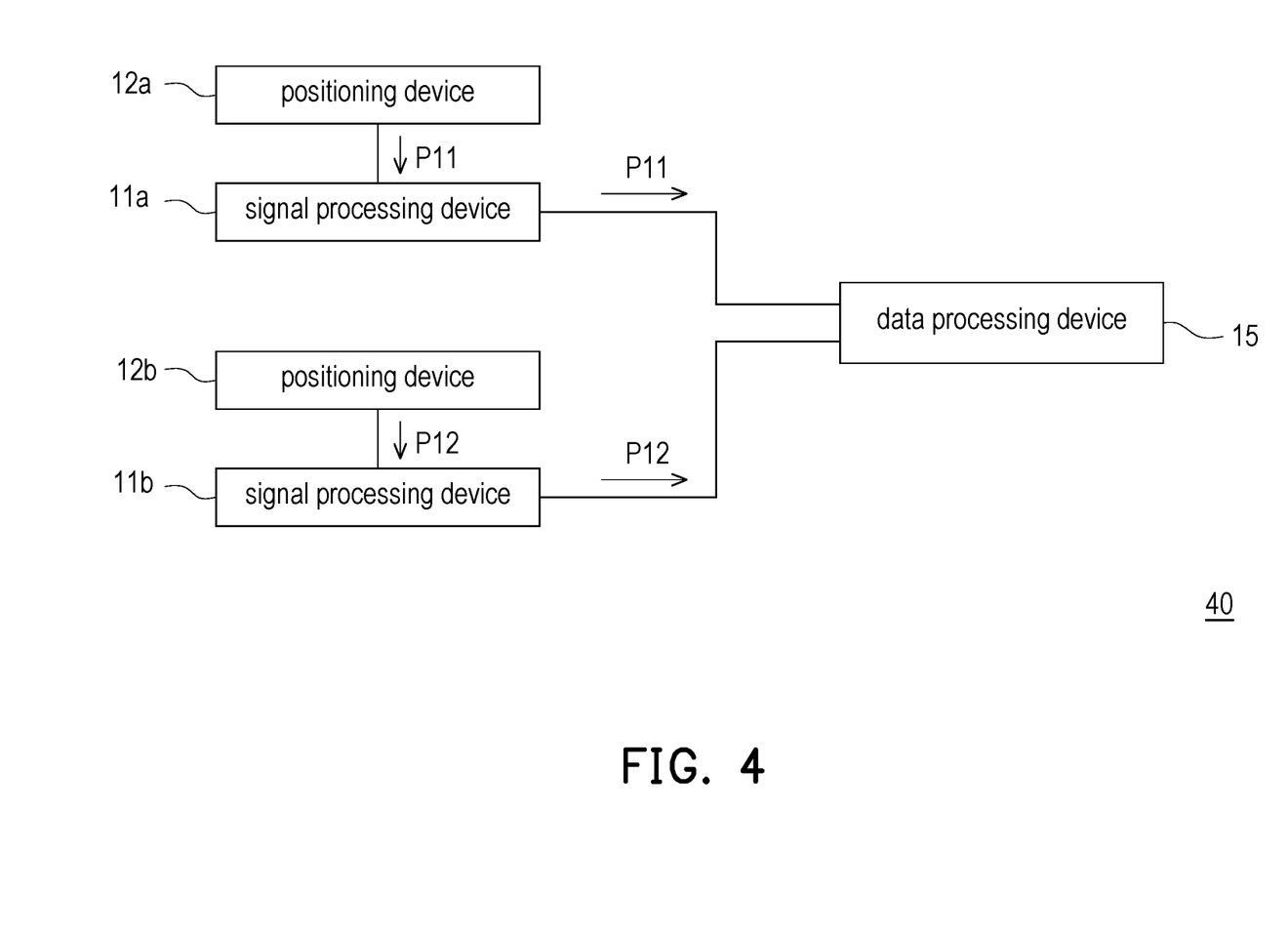
FIG. 4 shows the data processing system according to FIG. 1 of the disclosure.

See FIG. 4, which shows the data processing system according to FIG. 1 of the disclosure. In FIG. 4, the data processing system 40 may include signal processing devices 11a, 11b, positioning devices 12a, 12b, and the data processing device 15. In the embodiment, each of the signal processing devices 11a and 11b can be the same kind of device as the signal processing device 11 in FIG. 1. Each of the positioning devices 12a and 12b can be the same kind of device as the positioning device 12 in FIG. 1, and the data processing device 15 in FIG. 4 can be the same device as the data processing device 15 in FIG. 1. In addition, the data processing system 40 can further include other devices in FIG. 1, such as the lens encoder 13, the terminal device 16, the clock source 17, but the disclosure is not limited thereto.

In the embodiments of the disclosure, similar to the situation of the signal processing device 11 and the positioning device 12 being mounted on the camera device 14 in FIG. 1, the signal processing device 11*a* and the positioning device 12*a* can be mounted on the corresponding camera device (not shown) or other to be tracked object/locations. Likewise, the signal processing device 11*b* and the positioning device 12*b* can be mounted on the corresponding camera device (not shown) or other to be tracked object/locations.

In addition, although only two combinations of the signal processing device and the positioning device (each combination at least includes one signal processing device and one positioning device) is shown in FIG. 4, the data processing system 40 may include more combinations of the signal processing device and the positioning device, but the disclosure is not limited thereto. In addition, for connecting with the signal processing devices 11*a*, 11*b* (and other additional signal processing devices), the data processing device 15 can be disposed with corresponding amount of first network interfaces 151. For example, if the data processing device 15 needs to be able to be connected with up to N (N is a positive integer) signal processing devices, the data processing device 15 can be designed with N first network interfaces 151, but the disclosure is not limited thereto.

In some embodiments, the data processing device 15 may determine the camera poses of the camera devices corresponding to the positioning device 12*a*, 12*b* based on the positioning data from the positioning devices 12*a*, 12*b*. The data processing device 15 can send the determined camera poses of the camera devices to the terminal device 16 for the terminal device 16 to produce the corresponding virtual production (e.g., combining cropped image regions corresponding to real objects with the rendered virtual scene), but the disclosure is not limited thereto.

Figure 5:
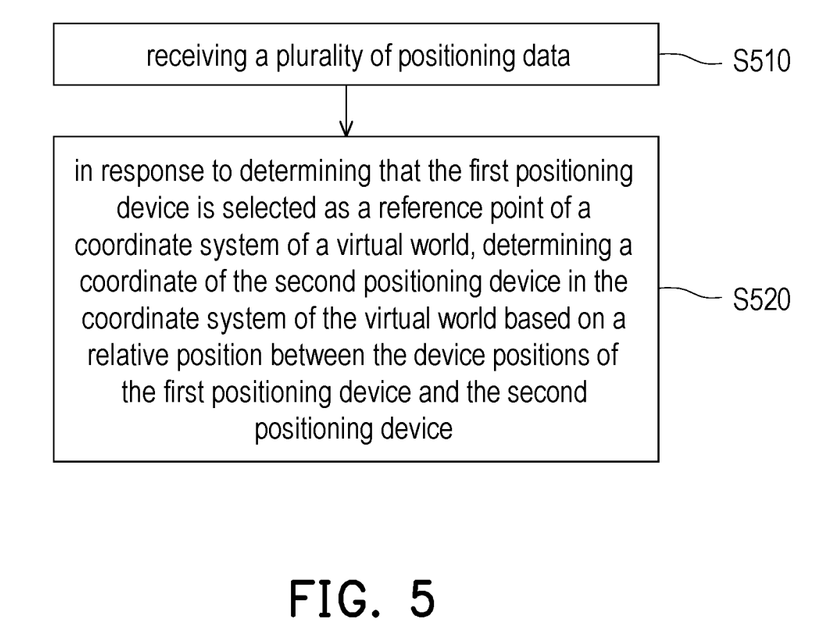
FIG. 5 shows a flow chart of the method for determining coordinates according to an embodiment of the disclosure.

See FIG. 5, which shows a flow chart of the method for determining coordinates according to an embodiment of the disclosure. The method of this embodiment may be executed by the data processing device 15 in FIG. 4, and the details of each step in FIG. 5 will be described below with the components shown in FIG. 4.

In step S510, the data processing device 15 receives a plurality of positioning data, wherein the plurality of positioning data correspond to device positions of a plurality of positioning devices in a real world, and the positioning devices comprise a first positioning device and a second positioning device.

For better explaining the concept of the disclosure, the positioning device 12*a* and 12*b* would be respectively assumed to be the first positioning device and the second positioning device, but the disclosure is not limited thereto.

In FIG. 4, the plurality of positioning data received by data processing device 15 may include a first positioning data P11 corresponding to the positioning device 12*a* and a second positioning data P12 corresponding to the positioning device 12*b*. In the embodiment, the data processing device 15 may receive the first positioning data P11 from the signal processing device 11*a* connected to the positioning device 12*a* and receive the second positioning data P12 from the signal processing device 11*b* connected to the positioning device 12*b*. Specifically, the signal processing device 11*a* may receive the positioning data P11 from the positioning device 12*a* and send the positioning data P11 to the data processing device 15, and the signal processing device 11*b* may receive the positioning data P12 from the positioning device 12*b* and send the positioning data P12 to the data processing device 15.

In other embodiments, the data processing device 15 can receive the positioning data P11 and P12 directly from each of the positioning data 12*a* and 12*b*, but the disclosure is not limited thereto.

As described in the embodiments of FIG. 1, the positioning data P11 may correspond to a first camera pose of a first camera device on which the signal processing device 11*a* and the positioning device 12*a* are mounted, and the positioning data P12 may correspond to a second camera pose of a second camera device on which the signal processing device 11*b* and the positioning device 12*b* are mounted, but the disclosure is not limited thereto.

In one embodiment, the positioning devices 12*a* and 12*b* may obtain the positioning data P11 and P12 via the outside-in tracking mechanism or inside-out tracking mechanism (e.g. SLAM). In outside-in tracking case, the positioning data P11 and P12 can be understood as characterizing the positions of the positioning devices 12*a* and 12*b* relative to, for example, the base stations, but the disclosure is not limited thereto.

In one embodiment, the data processing device 15 can determine the device positions of the positioning devices 12*a* and 12*b* in the real world. In an embodiment where the positioning data P11 includes the raw measurement data of the translation components and/or rotation components of the positioning device 12*a*, the data processing device 15 may analyse/process the positioning data P11 and accordingly determine the actual translation components and/or rotation components of the positioning device 12*a*, which can be used to determine the device position of the positioning device 12*a* in the real world. Similarly, in an embodiment where the positioning data P12 includes the raw measurement data of the translation components and/or rotation components of the positioning device 12*b*, the data processing device 15 may analyse/process the positioning data P12 and accordingly determine the actual translation components and/or rotation components of the positioning device 12*b*, which can be used to determine the device position of the positioning device 12*b* in the real world.

In step S520, in response to determining that the first positioning device (e.g., the positioning device 12*a*) is selected as a reference point of a coordinate system of a virtual world, the data processing device 15 determines a coordinate of the second positioning device (e.g., the positioning device 12*b*) in the coordinate system of the virtual world based on a relative position between the device positions of the first positioning device and the second positioning device.

For better explaining the concept of the disclosure, the reference point of the coordinate system of the virtual world would be assumed to be the origin of the coordinate system. In other embodiments, the reference point can be any other desired point in the coordinate system.

For example, it is assumed that a default reference point is the position of one of the base stations (i.e., the position of the base station regarded as the reference point may be (0, 0, 0)), and the device positions of the positioning device 12*a* and 12*b* are respectively (x1, y1, z1) and (x2, y2, z2) in the real world. In this case, when the positioning device 12*a* is selected as the origin of the coordinate system of the virtual world, the coordinate of the positioning device 12*a* in the coordinate system of the virtual world can be, for example, (0,0,0). Based on the relative position between the device positions of the positioning device 12a and 12b, the data processing device 15 may determine the coordinate of the positioning device 12b in the coordinate system of the virtual world to be, for example, (x2-x1, y2-y1, z2-z1), but the disclosure is not limited thereto.

Accordingly, the data processing device 15 can easily use the relative positions between each of the positioning devices 12a, 12b and the base stations in the real world to determine the coordinates of the positioning devices 12a, 12b in the virtual world, which increases the convenience of creating virtual production.

In one embodiment, the data processing device 15 can further provide the coordinates of the positioning devices 12a, 12b to the terminal device 16 in FIG. 1, such that the terminal device 16 can use these information to create a visual content with better quality, but the disclosure is not limited thereto.

In addition, by using the solution introduced in the disclosure, the coordinates of the positioning devices 12a, 12b in the virtual world can be easily determined even if the base stations are moved. To be specific, the user may change the locations of the base stations in the studio based on particular requirements. In this case, the user can simply determine the positioning device 12a as the reference point, and the coordinates of the positioning devices 12a and 12b in the virtual world can be properly determined even if the base stations have been moved to new locations.

For example, after the base stations used for outside-in tracking are moved, the devices positions of the positioning devices 12a and 12b may respectively become (x1', y1', z1') and (x2', y2', z2') relative to the base stations. However, when the positioning device 12a is selected as the reference point again, the coordinates of the positioning devices 12a and 12b in the virtual world would be respectively determined to be (0, 0, 0) and (x2'-x1', y2'-y1', z2'-z1'), wherein (x2'-x1', y2'-y1', z2'-z1') would be the same as (x2-x1, y2-y1, z2-z1). Accordingly, the efficiency of creating virtual production can be improved.

In one embodiment, in response to determining that the second positioning device (e.g., the positioning device 12b) is selected as the reference point of the coordinate system of the virtual world, the data processing device 15 can further determine a coordinate of the first positioning device (e.g., the positioning device 12a) in the coordinate system of the virtual world based on the relative position between the device positions of the first positioning device and the second positioning device.

In this case, when the positioning device 12b is selected as the origin of the coordinate system of the virtual world, the coordinate of the positioning device 12b in the coordinate system of the virtual world can be, for example, (0,0,0). Based on the relative position between the device positions of the positioning device 12a and 12b, the data processing device 15 may determine the coordinate of the positioning device 12b in the coordinate system of the virtual world to be, for example, (x1-x2, y1-y2, z1-z2), but the disclosure is not limited thereto.

That is, after the positioning device 12b is used as the origin, the data processing device 15 can change to use the positioning device 12b as the origin of the coordinate system of the virtual world, and the coordinates of the positioning devices 12a, 12b would be accordingly updated.

In the embodiment where the data processing system 40 includes other positioning devices, the data processing device 15 can determine a coordinate of each of other positioning devices in the coordinate system of the virtual world based on a relative position between the device positions of the positioning device selected as the reference point and each of the other positioning devices, but the disclosure is not limited thereto.

Figure 6:
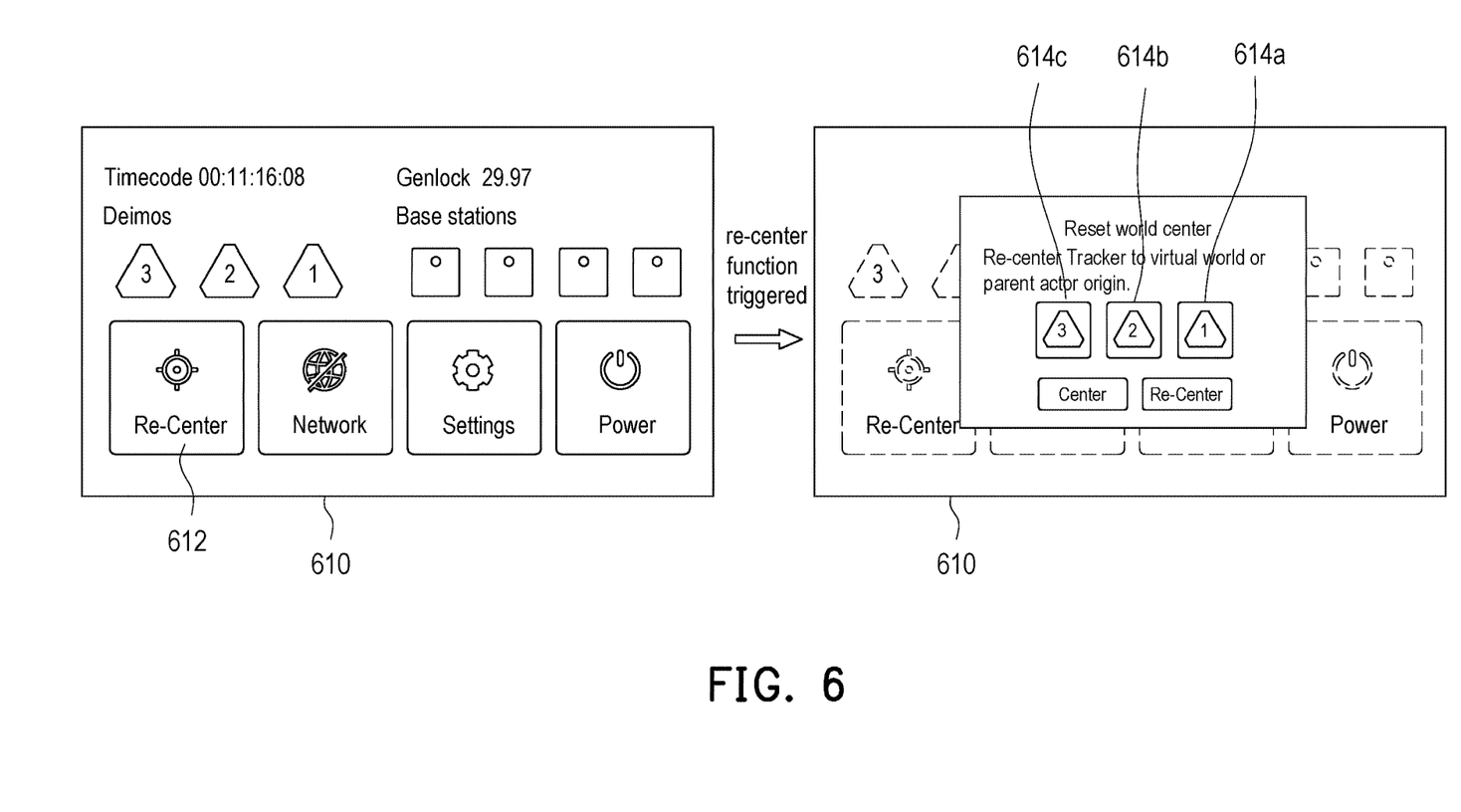
FIG. 6 shows a user interface provided by the data processing device according to an embodiment of the disclosure.

See FIG. 6, which shows a user interface provided by the data processing device 15 according to an embodiment of the disclosure. In FIG. 6, the data processing device 15 may provide a user interface 610, wherein the user interface 610 shows a re-center function 612. In the embodiment, the re-center function 612 can be used by the user to select a desired one of the positioning devices as the reference point of the coordinate system of the virtual world.

In one embodiment, in response to determining that the re-center function 612 is triggered, the data processing device 15 can provide a plurality of detected positioning devices in the user interface 610. In one embodiment, the data processing device 15 can detect the positioning devices by checking the positioning device information in the package data/pose data received from the positioning device(s), but the disclosure is not limited thereto. In one embodiment, the user interface 610 can only show the positioning devices currently detected by the data processing device 15.

In FIG. 6, assuming that the icons 614a-614c respectively corresponds to the positioning devices 12a, 12b, and another positioning device detected by the data processing device 15. In this case, the user can select the desired positioning device as the reference point of the coordinate system of the virtual world.

In one embodiment, assuming that the icon 614a corresponding to the positioning device 12a is selected by the user, the data processing device 15 can accordingly perform step S520 based on the descriptions in the above, but the disclosure is not limited thereto.

The disclosure further provides computer readable storage mediums for executing the data processing method and/or the method for determining coordinates. The computer readable storage medium is composed of a plurality of program instructions (for example, a setting program instruction and a deployment program instruction) embodied therein. These program instructions can be loaded into the data processing device and the signal processing device and executed by the same to execute the data processing method and/or the method for determining coordinates and the functions of the data processing device and the signal processing device described above.

In summary, the embodiments of the disclosure provide an easy, effective solution to accurately track the camera pose of the camera device when shooting contents. In the embodiments of the disclosure, the user (e.g., content creators) only needs to install the positioning device and/or the lens encoder onto the camera device, and the signal processing device and the data processing device can cooperate to facilitate the terminal device to synchronize the captured images and the camera poses of the camera device. Accordingly, the terminal device can combine the cropped image region (e.g., the image region corresponding to real objects such as actor/actress) with the rendered virtual scene more accurately based on the camera pose of the camera device, which improves the quality and the efficiency of creating virtual production.

In addition, the embodiments of the disclosure also provide a solution for determining the coordinates of the positioning devices in the coordinate system of the virtual world when one of the positioning devices is selected as the reference point of the virtual world. Accordingly, the embodiments of the disclosure can easily use the relative positions between each of the positioning devices and the base stations in the real world to determine the coordinates of the positioning devices in the virtual world, which increases the convenience of creating virtual production.

It will be apparent to those skilled in the art that various modifications and variations can be made to the structure of the present invention without departing from the scope or spirit of the disclosure. In view of the foregoing, it is intended that the present disclosure cover modifications and variations of this invention provided they fall within the scope of the following claims and their equivalents.

What is claimed is:

1. A data processing system, comprising:
at least one base station, configured to emit beacons;
a positioning device, configured to receive the emitted beacons to determine a positioning data;
a signal processing device, configured to perform:
receiving the positioning data from the positioning device, wherein the positioning data corresponds to a camera device;
receiving a lens parameter of the camera device from a lens encoder;
encapsulating the positioning data and the lens parameter in at least one data packet; and
sending the at least one data packet to a data processing device by a network interface, wherein the at least one base station and the signal processing device are different devices.

2. The system according to claim 1, wherein the signal processing device comprises:
a first data transmission port, coupled to the positioning device and receiving the positioning data from the positioning device;
a second data transmission port, coupled to the lens encoder and receiving the lens parameter of the camera device from the lens encoder, wherein the first data transmission port and the second data transmission port are plug and play ports;
a first processor, coupled to the first data transmission port and the second data transmission port and encapsulating the positioning data and the lens parameter in the at least one data packet; and
the network interface, coupled to the first processor and sending the at least one data packet.

3. The system according to claim 1, wherein the at least one data packet comprises a first data packet containing the lens parameter and a second data packet containing the positioning data.

4. The system according to claim 3, wherein the first data packet is a User Datagram Protocol (UDP) packet, and the first processor controls the network interface to send the first data packet via a UDP protocol.

5. The system according to claim 3, wherein the second data packet is a Transmission Control Protocol/Internet Protocol (TCP/IP) packet, and the first processor controls the network interface to send the second data packet via a Universal Serial Bus/IP (USB/IP) protocol.

6. The system according to claim 1, further comprising:
the data processing device, configured to perform:
receiving the at least one data packet from the signal processing device and retrieving the positioning data and the lens parameter from the at least one data packet;
determining a camera pose of the camera device based on the positioning data;
receiving a reference clock signal and accordingly determining a timestamp corresponding to the camera pose;
encapsulating the camera pose, the timestamp, and the lens parameter in a data signal; and
sending the data signal.

7. The system according to claim 6, wherein the reference clock signal comprises a plurality of clock pulses, and the data processing device performs:
determining the camera pose and the timestamp in response to one of the clock pulses, wherein the timestamp corresponds to a timing point of the one of the clock pulses.

8. The system according to claim 6, wherein the data processing device comprises:
a first network interface, coupled to the signal processing device and receiving the at least one data packet from the signal processing device;
a second processor, coupled to the first network interface, and determining a camera pose and the timestamp, and encapsulating the camera pose, the timestamp, and the lens parameter in the data signal; and
a second network interface, coupled to the second processor and sending the data signal.

9. The system according to claim 1, wherein the lens parameter comprises at least one counting value corresponding to at least one of an iris, a focus, a focal length of the camera device.

10. The system according to claim 1, wherein the signal processing device further performs:
receiving a lens controlling signal and accordingly control the lens encoder to adjust a lens setting of the camera device.

11. A data processing method, comprising:
emitting, by at least one base station, beacons;
receiving, by a positioning device, the emitted beacons to determine a positioning data;
receiving, by a signal processing device, the positioning data from the positioning device, wherein the positioning data corresponds to a camera device;
receiving, by the signal processing device, a lens parameter of the camera device from a lens encoder;
encapsulating, by the signal processing device, the positioning data and the lens parameter in at least one data packet; and
sending, by the signal processing device, the at least one data packet to a data processing device by a network interface, wherein the at least one base station and the signal processing device are different devices.

12. The system according to claim 11, wherein the at least one data packet comprises a first data packet containing the lens parameter and a second data packet containing the positioning data.

13. The system according to claim 12, wherein the first data packet is a User Datagram Protocol (UDP) packet, and the first data packet is sent via a UDP protocol.

14. The system according to claim 12, wherein the second data packet is a Transmission Control Protocol/Internet Protocol (TCP/IP) packet, and the second data packet is sent via a Universal Serial Bus/IP (USB/IP) protocol.

15. The system according to claim 11, further comprising:
receiving, by a data processing device, the at least one data packet from the signal processing device and retrieving, by the data processing device, the positioning data and the lens parameter from the at least one data packet;
determining, by the data processing device, a camera pose of the camera device based on the positioning data;

receiving, by the data processing device, a reference clock signal and accordingly determining a timestamp corresponding to the camera pose;

encapsulating, by the data processing device, the camera pose, the timestamp, and the lens parameter in a data signal; and sending, by the data processing device, the data signal.

16. The system according to claim 15, wherein the reference clock signal comprises a plurality of clock pulses, and the method comprises:

determining, by the data processing device, the camera pose and the timestamp in response to one of the clock pulses, wherein the timestamp corresponds to a timing point of the one of the clock pulses.

17. The system according to claim 11, wherein the lens parameter comprises at least one counting value corresponding to at least one of an iris, a focus, a focal length of the camera device.

18. The system according to claim 11, further comprising:

receiving, by the signal processing device, a lens controlling signal and accordingly controlling, by the signal processing device, the lens encoder to adjust a lens setting of the camera device.

19. A non-transitory computer readable storage medium, the computer readable storage medium recording an executable computer program, the executable computer program being loaded by a data processing system to perform steps of:

emitting, by at least one base station of the data processing system, beacons;

receiving, by a positioning device of the data processing system, the emitted beacons to determine a positioning data;

receiving, by a signal processing device of the data processing system, the positioning data from the positioning device, wherein the positioning data corresponds to a camera device;

receiving a lens parameter of the camera device from a lens encoder;

encapsulating the positioning data and the lens parameter in at least one data packet; and sending the at least one data packet to a data processing device by a network interface, wherein the at least one base station and the signal processing device are different devices.

* * * * *